(12) United States Patent
Pham et al.

(10) Patent No.: US 8,941,740 B2
(45) Date of Patent: Jan. 27, 2015

(54) PERSONNEL FIELD DEVICE FOR PROCESS CONTROL AND OTHER SYSTEMS AND RELATED METHOD

(75) Inventors: Hai D. Pham, Eden Prairie, MN (US); David R. Kaufman, Scottsdale, AZ (US); Ramakrishna S. Budampati, Maple Grove, MN (US); Anoop K. Mathur, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 1150 days.

(21) Appl. No.: 12/538,762

(22) Filed: Aug. 10, 2009

(65) Prior Publication Data

US 2010/0061703 A1    Mar. 11, 2010

Related U.S. Application Data

(60) Provisional application No. 61/094,788, filed on Sep. 5, 2008.

(51) Int. Cl.
G08B 21/02 (2006.01)
G08B 21/12 (2006.01)
(Continued)

(52) U.S. Cl.
CPC ............ *G08B 21/02* (2013.01); *G01P 15/00* (2013.01); *G01S 5/0009* (2013.01); *G01P 15/18* (2013.01);
(Continued)

(58) Field of Classification Search
CPC ........... G01P 15/18; G01P 1/023; G01P 7/00; G01P 15/00; G01S 19/41; G01S 5/0009; G01S 5/0018; G08B 21/02; G08B 21/12; G08B 21/14; H04N 5/765; G01C 15/00

USPC ................................................ 386/239, 230
See application file for complete search history.

(56) References Cited

U.S. PATENT DOCUMENTS 5,926,103 A    7/1999  Petite
6,116,815 A    9/2000  Chen
(Continued)

FOREIGN PATENT DOCUMENTS

EP    1 501 029 A2    1/2005
EP    1 657 610 A2    5/2006
(Continued)

OTHER PUBLICATIONS

"Connect802", Network Orange, http://www.netorange.com/products/connect802/suite_spot_survey/tt_connect802_survey.html, 2008, 3 pages.

(Continued)

*Primary Examiner* — Gelek W Topgyal (57) ABSTRACT

An apparatus includes an image recorder configured to record video images. The apparatus also includes a display screen configured to present the video images to a user and to create notations overlying one or more of the video images based on user input. The apparatus further includes a transceiver configured to stream the video images over a wireless mesh network and to transmit data associated with the notations over the wireless mesh network. The apparatus could also include components for providing cryptographic keys to wireless nodes joining the wireless mesh network, a sensor for detecting or measuring one or more characteristics, and/or an asset tracker for transmitting or receive signals for identifying a location of the apparatus. The apparatus could further include at least one voice unit supporting bidirectional voice communications and/or a site survey unit for identifying signal strengths associated with detected wireless nodes.

20 Claims, 3 Drawing Sheets

(51) Int. Cl.
*G08B 21/14* (2006.01)
*H04N 5/765* (2006.01)
*G01P 15/00* (2006.01)
*G01S 5/00* (2006.01)
*G01P 15/18* (2013.01)
*G01C 15/00* (2006.01)
*G01P 1/02* (2006.01)
*G01S 19/41* (2010.01)

(52) U.S. Cl.
CPC ............... *G01C 15/00* (2013.01); *G01P 1/023* (2013.01); *G01S 5/0018* (2013.01); *G01S 19/41* (2013.01); *G08B 21/12* (2013.01); *G08B 21/14* (2013.01); *H04N 5/765* (2013.01)
USPC ..... 348/158; 455/404.2; 340/669; 340/573.1; 324/162; 73/488

(56) References Cited

U.S. PATENT DOCUMENTS

| | | | |
|---|---|---|---|
| 6,415,646 B1 | 7/2002 | Kessel et al. | |
| 6,499,016 B1 | 12/2002 | Anderson | |
| 6,721,001 B1 | 4/2004 | Berstis | |
| 7,636,453 B2 * | 12/2009 | Porter et al. | 382/103 |
| 7,640,007 B2 * | 12/2009 | Chen et al. | 455/414.1 |
| 7,916,184 B2 * | 3/2011 | Utagawa et al. | 348/231.6 |
| 8,059,882 B2 | 11/2011 | Amidi | |
| 2003/0214401 A1 * | 11/2003 | Lee | 340/531 |
| 2004/0091115 A1 * | 5/2004 | Kurdziel et al. | 380/270 |
| 2004/0145485 A1 | 7/2004 | Tice | |
| 2005/0062677 A1 | 3/2005 | Nixon et al. | |
| 2005/0090294 A1 * | 4/2005 | Narasimhan | 455/575.1 |
| 2005/0140783 A1 * | 6/2005 | Akamatsu | 348/143 |
| 2006/0072757 A1 * | 4/2006 | Renkis | 380/270 |
| 2006/0176169 A1 | 8/2006 | Doolin et al. | |
| 2006/0255265 A1 | 11/2006 | Dalzell | |
| 2006/0259933 A1 * | 11/2006 | Fishel et al. | 725/105 |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |
| 2007/0149192 A1 * | 6/2007 | Kim et al. | 455/435.1 |
| 2007/0159161 A1 * | 7/2007 | Neill | 324/158.1 |
| 2007/0200917 A1 * | 8/2007 | Chen et al. | 348/14.01 |
| 2007/0205886 A1 | 9/2007 | Huseth et al. | |
| 2007/0241965 A1 | 10/2007 | Kolavennu et al. | |
| 2007/0268884 A1 | 11/2007 | Kolavennu et al. | |
| 2008/0122641 A1 | 5/2008 | Amidi | |
| 2008/0123934 A1 | 5/2008 | Amidi | |
| 2008/0208962 A1 | 8/2008 | Kim et al. | |
| 2009/0010484 A1 | 1/2009 | Amidi | |
| 2009/0273513 A1 * | 11/2009 | Huang | 342/357.12 |

FOREIGN PATENT DOCUMENTS

| | | |
|---|---|---|
| WO | WO 2004/057325 A1 | 7/2004 |
| WO | WO 2008/067236 A2 | 6/2008 |

OTHER PUBLICATIONS

"n-sight: Mobile Video Collaboration System", LibreStream, 2007, 4 pages.
"PanOS Platform, Unified Location Management Platform," PanGo, 2007, 2 pages.
"Ekahau T301-A Wi-Fi Tag," ekahau, 2007, 2 pages.
"IntelaTrac PKS Redefines Field Data Collection and Management," Honeywell, Feb. 2006, 2 pages.
Honeywell Process Solutions, "IntelaTrac PKS," Honeywell, 2 pages.
Honeywell Process Solutions, "Mobile Station," Honeywell, 2 pages.
"Improve Maintenance Efforts with DocuMint," Honeywell, Feb. 2006, 3 pages.
"Lumidor Minimax XT," Honeywell, Dec. 2005, 4 pages.
David R. Kaufman, et al., "Virtual Wireless Communication Industrial Site Survey", U.S. Appl. No. 12/106,606, filed Apr. 21, 2008.
"Onsight 1000, Mobile Collaboration Device", Librestream, 2008-2009, 2 pages.
"LibreStream Introduces n_sight—a Groundbreaking WiFi/IP Enabled Portable Collaboration Solution that Defines a New Product Category—Mobile Video Collaboration", Sep. 10, 2006, 1 page.

* cited by examiner

PERSONNEL FIELD DEVICE FOR PROCESS CONTROL AND OTHER SYSTEMS AND RELATED METHOD

CROSS-REFERENCE TO RELATED APPLICATIONS

This application claims priority under 35 U.S.C. §119(e) to U.S. Provisional Application No. 61/094,788 filed on Sep. 5, 2008, which is hereby incorporated by reference.

TECHNICAL FIELD

This disclosure relates generally to wireless devices and more specifically to a personnel field device for process control and other systems and related method.

BACKGROUND

Processing facilities are often managed using process control systems. Example processing facilities include manufacturing plants, chemical plants, crude oil refineries, and ore processing plants. Among other operations, process control systems typically manage the use of motors, valves, pumps, and other actuators or industrial equipment in the processing facilities. Field personnel in processing facilities are often required to carry various instruments and communication devices to support the functions performed by the field personnel. Moreover, wired cameras are often used in processing facilities, such as to provide monitoring or security functions in the processing facilities.

SUMMARY

This disclosure provides a personnel field device for process control and other systems and related method.

In a first embodiment, an apparatus includes an image recorder configured to record video images. The apparatus also includes a display screen configured to present the video images to a user. The display screen is also configured to create notations overlying one or more of the video images based on user input. The apparatus further includes a transceiver configured to stream the video images over a wireless mesh network. The transceiver is also configured to transmit data associated with the notations over the wireless mesh network.

In a second embodiment, a system includes a plurality of wireless nodes forming a wireless mesh network. The system also includes a field device having an image recorder, a display screen, and a transceiver. The image recorder is configured to record video images. The display screen is configured to present the video images to a user and to create notations overlying one or more of the video images based on user input. The transceiver is configured to stream the video images over the wireless mesh network and to transmit data associated with the notations over the wireless mesh network.

In a third embodiment, a method includes recording video images at a field device and presenting the video images to a user on a display screen at the field device. The method also includes receiving user input defining one or more notations overlying one or more of the video images at the field device. The method further includes streaming the video images and transmitting data associated with the one or more notations over a wireless mesh network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
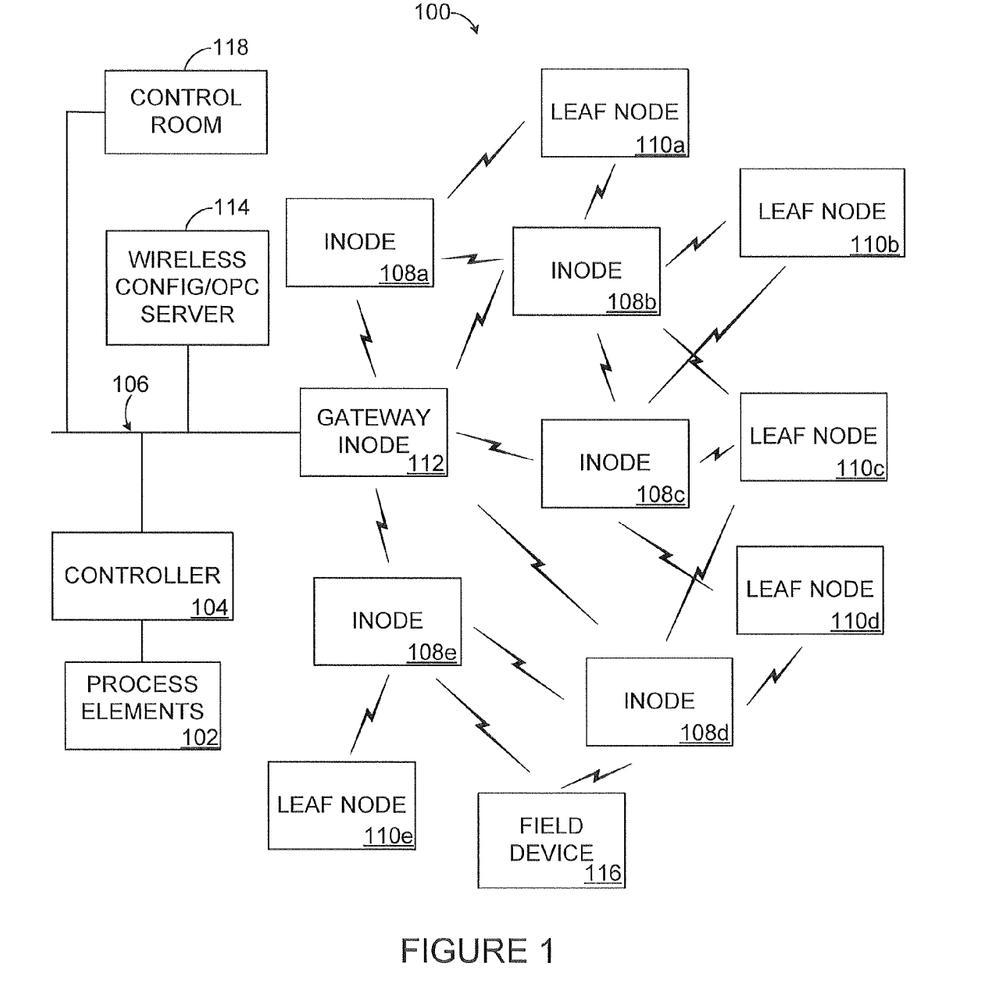
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations. In some embodiments, the network 106 could represent multiple networks, such as a pair of Ethernet networks or a FAULT TOLERANT ETHERNET (FTE) network from HONEYWELL INTERNATIONAL INC. (which includes a redundant pair of Ethernet networks).

In FIG. 1, the process control system 100 also includes one or more wireless networks for communicating with wireless sensors or other devices. In this example, a wireless network includes infrastructure multinodes ("iNodes") 108a-108e, leaf nodes 110a-110e, and a gateway infrastructure multinode 112.

The infrastructure multinodes 108a-108e and the leaf nodes 110a-110e engage in wireless communications with each other. For example, the infrastructure multinodes 108a-108e may receive data transmitted over the network 106 (via the gateway infrastructure multinode 112) and wirelessly communicate the data to the leaf nodes 110a-110e. Similarly, the leaf nodes 110a-110e may wirelessly communicate data to the infrastructure multinodes 108a-108e for forwarding to the network 106 (via the gateway infrastructure multinode 112). In addition, the infrastructure multinodes 108a-108e may wirelessly exchange data with one another. In this way, the infrastructure multinodes 108a-108e form a wireless network capable of providing wireless coverage to leaf nodes and other devices in a specified area, such as a large industrial complex.

In this example, the nodes 108a-108e and 110a-110e are divided into infrastructure multinodes and leaf nodes. The infrastructure multinodes 108a-108e typically represent routing devices that can store and forward messages for other devices. Infrastructure multinodes 108a-108e are typically line-powered devices, meaning these nodes receive operating power from an external source. Infrastructure multinodes 108a-108e are typically not limited in their operations since they need not minimize power consumption to increase the operational life of their internal power supplies. On the other hand, leaf nodes 110a-110e typically represent devices powered by local power supplies, such as nodes that receive operating power from internal batteries or other internal power supplies. Leaf nodes 110a-110e are often more limited in their operations in order to help preserve the operational life of their internal power supplies. The leaf nodes 110a-110e typically represent non-routing devices that do not store and forward messages for other devices.

The nodes 108a-108e and 110a-110e could also include other functionality, such as functionality for generating or using data communicated over the wireless network. For example, the leaf nodes 110a-110e could represent wireless sensors used to measure various characteristics within an industrial facility. The sensors could collect and communicate sensor readings to the controller 104 via the typically represent node 112. The leaf nodes 110a-110e could also represent actuators that receive control signals from the controller 104 and adjust the operation of the industrial facility. In this way, the leaf nodes may include or operate in a similar manner as the process elements 102 physically connected to the controller 104. The leaf nodes 110a-110e could further represent WiFi-enabled handheld user devices (such as INTELATRAC devices from HONEYWELL INTERNATIONAL INC.), mobile stations, tablet PCs, palmtop PCs, personal digital assistants, or any other or additional devices. The infrastructure multinodes 108a-108e may also include any of the functionality of the leaf nodes 110a-110e or the controller 104.

The gateway infrastructure multinode 112 communicates wirelessly with, transmits data to, and receives data from one or more infrastructure multinodes and possibly one or more leaf nodes. The gateway infrastructure multinode 112 may convert data between protocol(s) used by the network 106 and protocol(s) used by the nodes 108a-108e and 110a-110e. For example, the gateway infrastructure multinode 112 could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes 108a-108e and 110a-110e. The gateway infrastructure multinode 112 could also convert data received from one or more of the nodes 108a-108e and 110a-110e into Ethernet-formatted data for transmission over the network 106. In addition, the gateway infrastructure multinode 112 could support various functions, such as network creation and security, used to create and maintain a wireless network. The gateway infrastructure multinode 112 includes any suitable structure for facilitating communication between components or networks using different protocols.

In particular embodiments, the various nodes in the wireless network of FIG. 1 form a mesh network communicating at 2.4 GHz or 5.8 GHz. A particular example of a wireless mesh network is the ONEWIRELESS network from HONEYWELL INTERNATIONAL INC. Also, in particular embodiments, data can be injected into the wireless mesh network through the infrastructure multinodes or leaf nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the process control system 100. For example, the server 114 could configure the operation of the nodes 108a-108e, 110a-110e, and 112. The server 114 could also support security in the process control system 100, such as by distributing cryptographic keys or other security data to various components in the process control system 100 (like the nodes 108a-108e, 110a-110e, and 112). The server 114 includes any hardware, software, firmware, or combination thereof for configuring wireless networks and providing security information.

As noted above, the leaf nodes could include handheld user devices. In accordance with this disclosure, to support operations performed by various field personnel, one or more personnel field devices 116 could be used in the process control system 100. The personnel field devices 116 may act as wireless-enabled leaf nodes in the sense that they can communicate wirelessly with the infrastructure multinodes 108a-108e (and possibly directly with the gateway infrastructure multinode 112) to receive wireless service in different areas of a processing facility or other area. Not only that, the personnel field devices 116 can continue to receive wireless service as the devices 116 are moved within the facility or other area.

Moreover, each of the personnel field devices 116 includes various functionality incorporated into a single apparatus. For example, each personnel field device 116 could include functionality that supports the streaming of live video over its wireless connection. Each personnel field device 116 could also include functionality supporting still image photographic functions, Voice over IP (VoIP) or cellular communication services, and sensor or detection functions. Various other or additional functions could also be incorporated into the personnel field devices 116 depending on the functions performed by users of the personnel field devices 116.

The personnel field devices 116 could also include any suitable input/output mechanisms for interacting with users. For example, the personnel field devices 116 could include buttons that initiate video recording or photographic image capture. A keyboard or buttons could also be used to send text messages or initiate voice communications. A stylus could be provided for drawing on a display screen, writing notes, or selecting "soft" buttons or other items presented on the display screen. Any other or additional mechanism(s) could be used to provide input and output to users of the personnel field devices 116.

One example use of the personnel field device 116 in an industrial facility could be as follows. A maintenance technician can use the personnel field device 116 during his or her maintenance shift in an industrial plant. The personnel field device 116 can automatically search for, detect, and select infrastructure multinodes for use in communicating with a control room 118. When the technician reaches a first point where an inspection is to be performed, the technician can use the personnel field device 116 to capture images and video of industrial equipment at that point. The images and video can be transmitted to the control room 118 and displayed in real-time. The technician can also engage in VoIP or other voice communications with personnel in the control room 118 or elsewhere to discuss any issues noted by the technician. The technician can use a stylus to draw notes, circle areas of an image, or otherwise send manually "written" notations to the control room 118. If the technician finds something in need of repair, the technician can use these features to interact with a supervisor in the control room 118 and make a determination how to proceed. Personnel in the control room 118 could review video or other images and notations from the technician, zoom into areas of the images for review, and engage in voice communications with the technician. Once the repair is done, the technician can move on to the next point, and the personnel field device 116 can stay in contact with the control room 118 in the various positions.

Figure 2A:
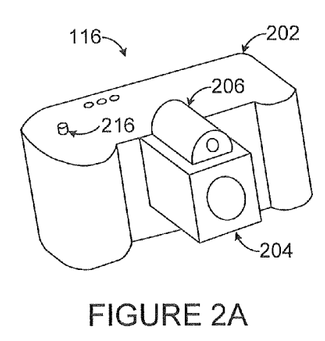
FIGS. 2A and 2B illustrate an example personnel field device for process control and other systems according to this disclosure.
Figure 2B:
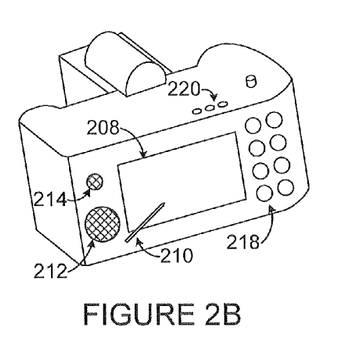
Figure 3:
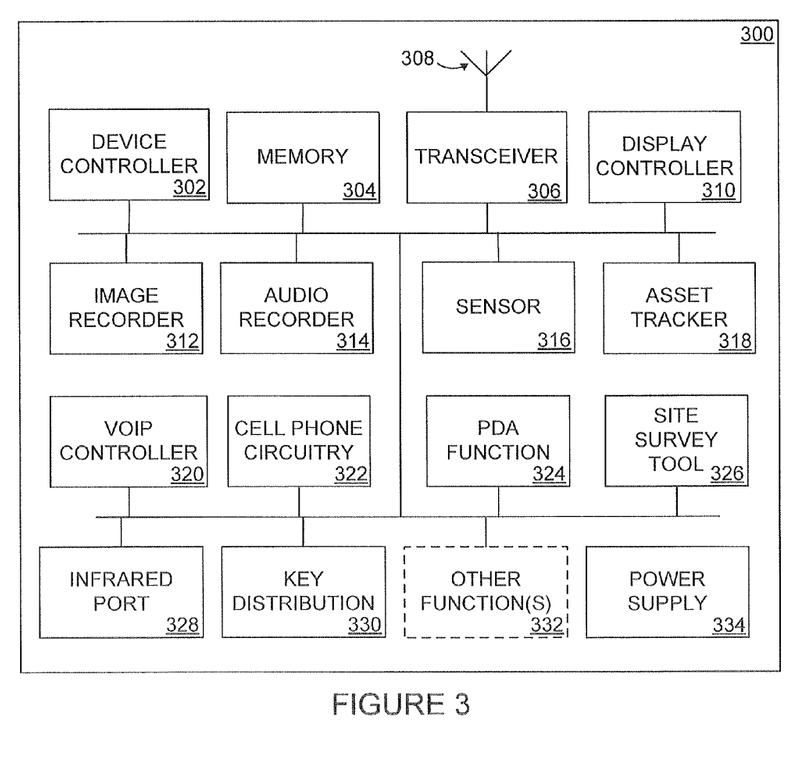
FIG. 3 illustrates additional details of an example personnel field device for process control and other systems according to this disclosure.

In this way, the personnel field device 116 allows a field technician or other personnel to use a single device to perform multiple functions. Moreover, the personnel field device 116 enables more effective real-time interaction with the personnel when actually in the field. The personnel field device 116 includes any suitable structure supporting real-time video streaming and other functions in a processing environment or other environment. Example details of one embodiment of the personnel field device 116 are shown in FIGS. 2A, 2B, and 3, which are described below. Note that while the personnel field device 116 has been described as operating in a process control system associated with an industrial facility, the personnel field device 116 could be used in a wide variety of environments. For example, the personnel field device 116 could be used in refineries, steel mills, factories, airports, schools, hospitals, other large buildings or complexes, restaurants, or generally any other facility or area having one or more wireless networks.

Although FIG. 1 illustrates one example of a process control system 100, various changes may be made to FIG. 1. For example, the process control system 100 could include any number of process elements, controllers, networks (wired or wireless), infrastructure multinodes (gateway or other), leaf nodes, servers, personnel field devices, and control rooms. Also, the functional division shown in FIG. 1 is for illustration only. Various components in FIG. 1 could be combined, subdivided, or omitted and additional components could be added according to particular needs. In addition, FIG. 1 illustrates one example operational environment where a personnel field device could be used. This type of device could be used with any other suitable system.

FIGS. 2A and 2B illustrate an example personnel field device 116 for process control and other systems according to this disclosure. The embodiment of the personnel field device 116 shown in FIGS. 2A and 2B is for illustration only. Other embodiments of the personnel field device 116 could be used without departing from the scope of this disclosure.

As shown in FIG. 2A, the personnel field device 116 includes a housing 202, which contains or encases various other components of the personnel field device 116. In this example, the housing 202 is shaped like a digital camera, although a housing 202 with any other suitable shape could also be used. The housing 202 could be formed from any suitable material(s), such as rugged plastic or other material suitable for long-term use in an abusive environment. The housing 202 could also have other features or characteristics, such as by being water-resistant, air-tight, or explosion-resistant.

The personnel field device 116 also includes a lens system 204 and a light/flash system 206, which are used for capturing video or still photographic images. The lens system 204 includes a lens for focusing light onto an image recorder (such as a CMOS or CCD image sensor) within the personnel field device 116. The lens system 204 could also include a mechanism for moving the lens (to focus an image being captured) and a lens housing (to protect the lens). The light/flash system 206 may include one or more structures (such as LEDs) for generating light used during the capture of photographic or other images.

As shown in FIG. 2B, the personnel field device 116 also includes a display 208. The display 208 presents information to a user, such as graphical images (still or video) captured by the personnel field device 116 or information received from a control room 118 or other source. The display 208 may also optionally receive input from the user. For example, the display 208 could represent a touch-sensitive display, and a user could use a stylus 210 or other input device (such as a pen/pencil tip or even his or her fingers) to draw text, circles, flow charts, diagrams, and other content on the display 208. The display 208 could also present buttons or other "soft" input mechanisms and receive selections from the user. The display 208 includes any suitable structure for at least presenting graphical information to a user, such as an LCD screen.

The personnel field device 116 also includes a speaker 212 and a microphone 214. The speaker 212 and microphone 214 support, among other things, audio interaction between a user using the personnel field device 116 and personnel in a control room 118 or other area. The speaker 212 includes any suitable structure for presenting audio information, and the microphone 214 includes any suitable structure for capturing audio information.

As shown here, the personnel field device 116 also includes various input/output components (apart from the display 208). For example, a button 216 can be used to control when the personnel field device 116 captures video or still photographic images. Buttons 218 can be used to invoke particular functions of the personnel field device 116, control communications by the personnel field device 116, or otherwise allow a user to perform or control various functions. In addition, the personnel field device 116 includes one or more status indictors 220, such as LEDs. The status indictors 220 could provide any suitable indications to a user, such as a battery power supply level, a quality of a wireless connection, or a readiness to take flash photographs.

Although 2A and 2B illustrate one example of a personnel field device 116 for process control and other systems, various changes may be made to FIGS. 2A and 2B. For example, the personnel field device 116 could have any suitable size and shape. The personnel field device 116 could also include any suitable input/output mechanisms and support any suitable functionality.

FIG. 3 illustrates additional details of an example personnel field device 116 for process control and other systems according to this disclosure. The embodiment of the personnel field device 116 shown in FIG. 3 is for illustration only. Other embodiments of the personnel field device 116 could be used without departing from the scope of this disclosure.

As shown here, the personnel field device 116 includes a device controller 302, which controls the overall operation of the device 116. For example, the device controller 302 may invoke various functions of the personnel field device 116 in response to user inputs. The device controller 302 may also facilitate communications over a wireless network, such as by providing data to other component(s) in the device 116 for transmission and by receiving data received over a wireless network. The device controller 302 includes any hardware, software, firmware, or combination thereof for controlling the overall operation of the personnel field device 116. As particular examples, the device controller 302 could represent a processor, microprocessor, microcontroller, field programmable gate array, or other processing or control device.

A memory 304 is coupled to the device controller 302. The memory 304 stores any of a wide variety of information used, collected, or generated by the personnel field device 116. For example, the memory 304 could store device configuration data, graphical data (such as video or still photographic images), audio information, text, and other data associated with operation of the personnel field device 116. The memory 304 includes any suitable volatile and/or non-volatile storage and retrieval device(s).

The personnel field device 116 also includes a wireless transceiver 306 coupled to an antenna 308. The transceiver 306 and antenna 308 can be used to communicate wirelessly with other devices, such as with one or more infrastructure multinodes. The transceiver 306 includes any suitable structure for providing signals for wireless transmission and/or obtaining signals received wirelessly. In some embodiments, the transceiver 306 represents a radio frequency (RF) transceiver, such as a frequency hopping spread spectrum (FHSS), Ultra-Wide Band (UWB), WiFi, BLUETOOTH, or IEEE 802.15.4 transceiver. The transceiver 306 could also include a transmitter and a separate receiver. The antenna 308 represents any suitable structure for transmitting and/or receiving wireless signals, such as an RF antenna.

The remaining components shown in FIG. 3 provide various other functionality in the personnel field device 116. For example, a display controller 310 controls the presentation of information on the display 208 of the personnel field device 116. As a particular example, the display controller 310 could present images on the display 208, such as video or still images captured using the personnel field device 116. The display controller 310 could also receive data indicative of text or other notations "drawn" on the display 208, such as those made using the stylus 210. The display controller 310 could then pass this information on to the device controller 302. In addition, the display controller 310 could receive information that is received wirelessly (such as via the device controller 302) and present that information on the display 208. The display controller 310 includes any hardware, software, firmware, or combination thereof for controlling at least one graphical display.

An image recorder 312 and an audio recorder 314 are used to capture graphical information (such as video or still images) and audio information. For example, the image recorder 312 could record images based on light provided through the lens system 204. Similarly, the audio recorder 314 could record audio information based on signals provided by the microphone 214. The image recorder 312 includes any suitable structure for recording graphical information, such as a CMOS or CCD image sensor. The audio recorder 314 includes any suitable structure for recording audio information, such as a digital recording device.

One or more sensors 316 can be used to detect one or more conditions associated with the personnel field device 116 or its environment. The sensors 316 could, for example, measure temperature, humidity, acoustics, acceleration, voltage, resistance, ampere, force, velocity, air flow, or pressure in the surrounding environment. The sensors 316 could also determine if hazardous materials are present, such as hazardous gasses like carbon monoxide. The sensors 316 could further detect rapid acceleration or deceleration, such as that associated with a user falling. Based on any detected conditions, the device controller 302 could initiate one or more alarms, such as an alarm wirelessly sent to the control room 118 identifying the detected condition. Data from the sensors 316 could also be presented on the display 208, such as when readings from a voltmeter or ammeter are presented on the display 208. The sensors 316 could be used to detect any other or additional conditions. Each sensor 316 includes any suitable structure for identifying one or more conditions.

The personnel field device 116 also includes an asset tracker 318, which can be used to help identify a position associated with the personnel field device 116. For example, the asset tracker 318 could represent an active or passive radio frequency identification (RFID) device that can transmit RF signals, which are received by the infrastructure multinodes or other transceivers and used to identify a position of the asset tracker 318. The asset tracker 318 could also represent a Global Positioning System (GPS) receiver, UWB tag, EPC tag, or WiFi transceiver capable of receiving signals and identifying its position. The asset tracker 318 could use any suitable signals for identifying its position, such as GPS, transmit UWB, narrow band, FHSS, DSSS, WiFi, or BLUETOOTH signals. The asset tracker 318 could then make this position available to the device controller 302 for transmission via the transceiver 306. The asset tracker 318 could use any other technique to identify its actual or approximate position. Also, the asset tracker 318 could operate continuously, at specified intervals, or in response to certain conditions. As a particular example, the asset tracker 318 could operate intermittently unless a specified condition (such as rapid acceleration or deceleration) is detected, at which point the asset tracker 318 could operate continuously. The asset tracker 318 includes any suitable structure facilitating identification of the position of the personnel field device 116.

A VoIP controller 320 supports VoIP voice communication sessions involving the personnel field device 116. For example, the VoIP controller 320 could cause audio information captured using the audio recorder 314 to be transmitted over a packet-based or other data-based wireless link, such as to a control room 118. The VoIP controller 320 could also cause audio information received over a wireless link to be directed to the speaker 212 for presentation to a user. The VoIP controller 320 includes any hardware, software, firmware, or combination thereof for controlling voice communications over a wireless packet-based or other data network.

Cell phone circuitry 322 facilitates communications over a cellular or other mobile telephone network. For example, the cell phone circuitry 322 could cause audio information captured using the audio recorder 314 to be transmitted over a GSM or CDMA voice network. The cell phone circuitry 322 could also cause audio information received over a GSM or CDMA network to be directed to the speaker 212 for presentation to a user. The cell phone circuitry 322 includes any hardware, software, firmware, or combination thereof for supporting voice communications over a cellular or other mobile telephone network.

Personal Digital Assistant (PDA) functions 324 support various functions typically associated with PDAs. This can include email and calendar or scheduling functionality, along with contact information for various individuals or groups. The PDA functions 324 could support any other or additional functionality.

A site survey tool 326 supports the measurement of wireless signal strengths by the personnel field device 116. For example, when other functions are being used (such as live video streaming), the site survey tool 326 could display a small signal strength indicator in a corner of the display 208. The signal strength indicator could identify the strength of a wireless signal from an infrastructure multinode currently serving the personnel field device 116. The site survey tool 326 could also display a list of all infrastructure multinodes currently detected by the site survey tool 326 and a signal strength for each of those infrastructure multinodes. The site survey tool 326 includes any hardware, software, firmware, or combination thereof for identifying wireless signal strengths.

The personnel field device 116 may further include components for distributing cryptographic keys or other security-related information to infrastructure multinodes, leaf nodes, or other nodes in a wireless network. In this example, the personnel field device 116 includes an infrared port 328 and a key distribution unit 330. The infrared port 328 supports communications using infrared signals. The key distribution unit 330 is responsible for maintaining cryptographic keys (such as keys obtained from the OPC server 114) and providing the cryptographic keys to the infrared port 328 for communication. As a particular example, when a new infrastructure multinode or leaf node is deployed, the key distribution unit 330 can provide (via the infrared port 328) the new node with the necessary key(s) for communicating in a wireless network. Moreover, the use of infrared signals (which have limited range) can help to reduce or prevent the capture of the cryptographic keys by other nearby components. In this way, the personnel field device 116 provides a secure mechanism for distributing cryptographic keys to multinodes and other nodes. The infrared port 328 includes any suitable structure for facilitating communications using infrared signals. Note, however, that the use of infrared signals is for illustration only, and other types of signals could be used. The key distribution unit 330 includes any hardware, software, firmware, or combination thereof for storing and providing cryptographic keys or other security-related information. The key distribution unit 330 could, for instance, represent the ONE-WIRELESS Authentication application from HONEYWELL INTERNATIONAL INC.

The personnel field device 116 can further include one or more additional components 332, which could provide any other desired or necessary functionality to field personnel. The additional components 332 could, for example, be based on the specific environment in which the personnel field device 116 is used.

In addition, the personnel field device 116 includes a power supply 334. The power supply 334 represents any suitable source of operating power for components of the personnel field device 116. The power supply 334 could, for example, include one or more rechargeable batteries, solar cells, fuel cells, or other power sources.

Although FIG. 3 illustrates additional details of one example personnel field device 116 for process control and other systems, various changes may be made to FIG. 3. For example, various components in FIG. 3 could be combined, subdivided, or omitted and additional components could be added according to particular needs. As a particular example, various controllers shown in FIG. 3 could be combined into a single controller. Also, functions described as being performed by one component in the personnel field device 116 could be performed by another component, such as when a function described above for one controller is performed by another controller.

Figure 4:
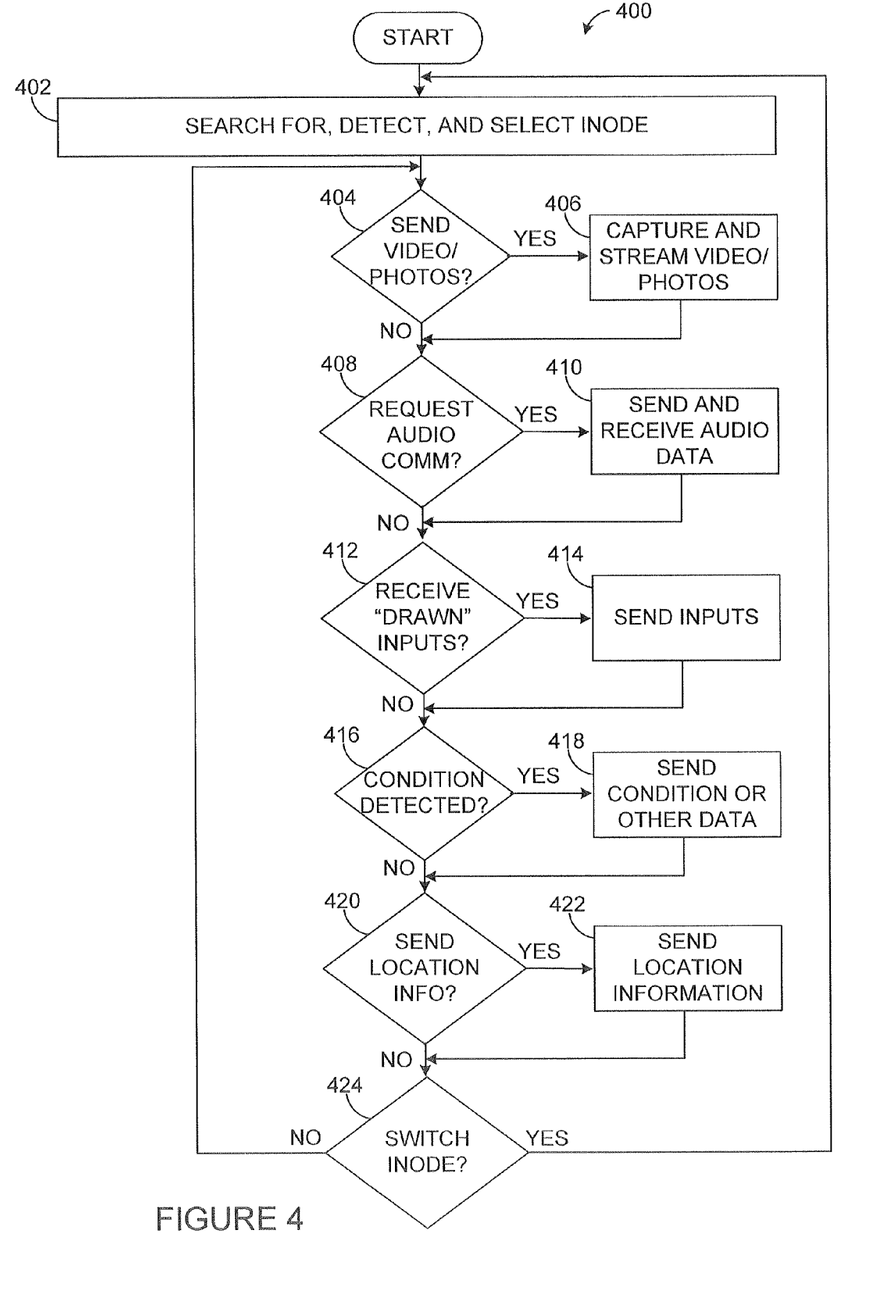
FIG. 4 illustrates an example method for operating a personnel field device in a process control or other system according to this disclosure.

FIG. 4 illustrates an example method 400 for operating a personnel field device in a process control or other system according to this disclosure. The embodiment of the method 400 shown in FIG. 4 is for illustration only. Other embodiments of the method 400 could be used without departing from the scope of this disclosure.

A personnel field device searches for, detects, and selects at least one infrastructure multinode at step 402. This could include, for example, the personnel field device 116 attempting to identify any infrastructure multinodes in its area and selecting the infrastructure multinode with the strongest signal strength. Any suitable techniques could be used to identify infrastructure multinodes and to select one or more of the identified infrastructure multinodes.

At this point, the personnel field device can communicate over a wireless network and perform various functions. For example, if a user wishes to send video or still photographic images at step 404, the video or images are captured and streamed at step 406. This could include, for example, the image recorder 312 capturing still or video images (and possibly the audio recorder 314 capturing audio associated with the video images). This may also include the transceiver 306 communicating the images over the wireless network to a control room 118 or other destination(s).

If the user wishes to engage in audio communications (such as VoIP or cellular communications) step 408, audio data is sent and received by the personnel field device at step 410. This could include, for example, the audio recorder 314 capturing audio information and the transceiver 306 transmitting the audio information to the control room 118 or other destination(s). This could also include the speaker 212 presenting audio information received from the control room 118 or other source(s) to the user.

If the user "draws" any content on the display screen of the personnel field device at step 412 (such as by using a stylus), the inputs are sent over the wireless network at step 414. This could include, for example, the display controller 310 generating data associated with circles, text, or other notations drawn on the display 208 using the stylus 210. This could also include the transceiver 306 communicating the data over the wireless network to the control room 118 or other destination(s). The data could be transmitted along with, for instance, the image on which the content is drawn, allowing personnel in the control room 118 to view the exact same content currently presented on the display 208.

If a specified condition is detected at step 416, the identity of the condition or other data (such as an alarm) can be sent at step 418. This could include, for example, the sensor 316 detecting certain conditions (such as temperature, pressure, acceleration, voltage, ampere, force, acoustics, relative humidity, or hazardous material). This could also include the transceiver 306 transmitting data identifying the condition or an alarm associated with the identified condition. Note that, in other embodiments, sensor data from the sensors 316 could constantly be sent by the personnel field device, regardless of whether any specified conditions have been detected (meaning step 416 could be skipped and step 418 could always be performed).

If location information is to be sent at step 420, the location information is transmitted over the wireless network at step 422. The location information could take any suitable form, such as an active RFID or other signal (used by other devices to identify a position) or an actual position (as determined using GPS, UWB, WiFi RSSI, FHSS RSSI, DSSS RSSI, or other technique). Note that, in other embodiments, location information from the asset tracker 318 could constantly be sent by the personnel field device (meaning step 416 could be skipped and step 418 could always be performed).

A determination is made whether to switch infrastructure multinodes at step 424. This could include, for example, determining if another infrastructure multinode with a better communication channel is available. This could also include the personnel field device moving out of range of its selected infrastructure multinode. If no change is currently needed, the method 400 returns to step 404 to repeat any of the various functions described above. If a change is needed, the method 400 returns to step 402, where the personnel field device can search for, identify, and select a new infrastructure multinode.

Although FIG. 4 illustrates one example of a method 400 for operating a personnel field device in a process control or other system, various changes may be made to FIG. 4. For example, while shown as a series of steps, various steps in FIG. 4 could overlap, occur in parallel, or occur in a different order. As a particular example, any of the steps 404-422 could be performed at the same time in the personnel field device. Also, the various functions shown in FIG. 4 are merely a subset of the wide variety of functions that could be performed using the personnel field device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
an image recorder configured to record still and video images;
an audio recorder configured to record audio information;
a display screen configured to present the images to a user, the display screen also configured to create notations overlying one or more of the images based on user input, the user input defined by physical contact with the display screen;
a transceiver configured to stream the video images over a wireless mesh network, the transceiver also configured to transmit data associated with the notations over the wireless mesh network;
a sensor configured to detect one or more characteristics of the apparatus or a surrounding environment, the one or more characteristics comprising an acceleration event, wherein the acceleration event is a rapid acceleration or deceleration of the apparatus;
a Voice over Internet Protocol (VoIP) controller configured to cause voice information captured using the audio recorder to be transmitted over the wireless mesh network via the transceiver;
an asset tracker configured to provide location information of the apparatus for transmission by the transceiver over the wireless mesh network, the asset tracker configured to operate continuously whenever the acceleration event is detected by the sensor and operate intermittently at specified intervals whenever the acceleration event is not detected by the sensor; and
a housing configured to retain the image recorder, the audio recorder, the display screen, the transceiver, the sensor, and the VoIP controller.

2. The apparatus of claim 1, wherein the apparatus is further configured to perform Personal Digital Assistant (PDA) functions including email, calendar or scheduling, and contact information storage.

3. The apparatus of claim 1, further comprising:
an infrared port configured to transmit one or more cryptographic keys to one or more wireless nodes that are configured to join the wireless mesh network.

4. The apparatus of claim 1, further comprising:
a controller configured to initiate an alarm based on one or more sensor readings from the sensor.

5. The apparatus of claim 1, wherein the display screen is further configured to present one or more measurements from the sensor.

6. The apparatus of claim 1, wherein the VoIP controller supports bidirectional voice communications.

7. A system comprising:
a plurality of wireless nodes forming a wireless mesh network; and
a field device comprising:
an image recorder configured to record still and video images;
an audio recorder configured to record audio information;
a display screen configured to present the images to a user, the display screen also configured to create notations overlying one or more of the images based on user input defined by physical contact with the display screen;
a transceiver configured to stream the video images over the wireless mesh network, the transceiver also configured to transmit data associated with the notations over the wireless mesh network;

a sensor configured to detect one or more characteristics of the field device or a surrounding environment, the one or more characteristics comprising an acceleration event, wherein the acceleration event is a rapid acceleration or deceleration of the field device;

a Voice over Internet Protocol (VoIP) controller configured to cause voice information captured using the audio recorder to be transmitted over the wireless mesh network via the transceiver;

an asset tracker configured to provide location information of the field device for transmission by the transceiver over the wireless mesh network, the asset tracker configured to operate continuously whenever the acceleration event is detected by the sensor and operate intermittently at specified intervals whenever the acceleration event is not detected by the sensor; and a housing configured to retain the image recorder, the audio recorder, the display screen, the transceiver, the sensor, and the VoIP controller.

8. The system of claim 7, wherein the field device is further configured to perform Personal Digital Assistant (PDA) functions including email, calendar or scheduling, and contact information storage.

9. The system of claim 7, wherein the field device further comprises:
a controller configured to initiate an alarm based on one or more sensor readings from the sensor.

10. The system of claim 7, wherein the display screen is further configured to present one or more measurements from the sensor.

11. The system of claim 7, wherein the VoIP controller supports bidirectional voice communications.

12. A method comprising:
recording still and video images using an image recorder of a field device;
recording audio information using an audio recorder of the field device;
presenting the images to a user on a display screen of the field device;
receiving user input defining one or more notations overlying one or more of the images at the field device, the user input defined by physical contact with the display screen;
streaming the video images and transmitting data associated with the one or more notations over a wireless mesh network using a transceiver of the field device;
detecting one or more characteristics of the field device or a surrounding environment using a sensor of the field device, the one or more characteristics comprising an acceleration event, wherein the acceleration event is a rapid acceleration or deceleration of the field device;
causing voice information captured using the audio recorder to be transmitted over the wireless mesh network using Voice over Internet Protocol (VoIP) communications;
providing, at an asset tracker, location information of the field device for transmission by the transceiver over the wireless mesh network, wherein the providing is performed continuously whenever the acceleration event is detected by the sensor and performed intermittently at specified intervals whenever the acceleration event is not detected by the sensor; and
housing the image recorder, the audio recorder, the display screen, the transceiver, the sensor, and the wireless transmitter in a housing.

13. The method of claim 12, further comprising:
performing Personal Digital Assistant (PDA) functions including email, calendar or scheduling, and contact information storage at the field device.

14. The method of claim 12, further comprising:
transmitting one or more cryptographic keys to one or more wireless nodes that are configured to join the wireless mesh network via an infrared port.

15. The method of claim 12, further comprising:
initiating an alarm based on one or more sensor readings from the sensor.

16. The method of claim 12, further comprising:
presenting one or more measurements from the sensor on the display screen.

17. The method of claim 12, further comprising:
supporting bidirectional voice communications.

18. An apparatus comprising:
an image recorder configured to record still and video images;
an audio recorder configured to record audio information;
a display screen configured to present the images to a user, the display screen also configured to create notations overlying one or more of the images based on user input, the user input defined by physical contact with the display screen;
a transceiver configured to stream the video images over a wireless mesh network, the transceiver also configured to transmit data associated with the notations over the wireless mesh network;
a sensor configured to detect one or more characteristics of the apparatus or a surrounding environment, the one or more characteristics comprising an acceleration event, wherein the acceleration event is a rapid acceleration or deceleration of the apparatus;
a Voice over Internet Protocol (VoIP) controller configured to cause voice information captured using the audio recorder to be transmitted over the wireless mesh network via the transceiver;
an asset tracker configured to provide location information of the apparatus for transmission by the transceiver over the wireless mesh network, the asset tracker configured to operate continuously whenever the acceleration event is detected by the sensor and operate intermittently at specified intervals whenever the acceleration event is not detected by the sensor;
cellular telephone circuitry configured to cause voice information captured using the audio recorder to be transmitted over a mobile telephone network;
a site surveyor configured to detect one or more wireless nodes transmitting wireless signals received by the transceiver and to identify a signal strength associated with each detected wireless node;
a key distributor configured to retrieve and provide cryptographic keys;
a wireless transmitter configured to transmit the cryptographic keys to one or more wireless nodes that are configured to join the wireless mesh network; and
a housing configured to retain the image recorder, the audio recorder, the display screen, the transceiver, the sensor, the VoIP controller, the asset tracker, the cellular telephone circuitry, the site surveyor, the key distributor, and the wireless transmitter;
wherein the housing is shaped to resemble a digital camera.

19. The apparatus of claim 18, wherein the apparatus is further configured to perform Personal Digital Assistant (PDA) functions including email, calendar or scheduling, and contact information storage.

20. The apparatus of claim 18, wherein the wireless transmitter comprises an infrared port configured to transmit the one or more cryptographic keys.

* * * * *